(12) United States Patent
Chari et al.

(10) Patent No.: US 7,457,853 B1
(45) Date of Patent: Nov. 25, 2008

(54) METHOD AND APPARATUS FOR AUTOMATICALLY CONFIGURING A NETWORK DEVICE

(75) Inventors: Srikumar Chari, Cupertino, CA (US); Premchandar Namasivayam, Tamil Nadu (IN); Jaidil Mohan K., Kerala (IN)

(73) Assignee: Cisco Technology, Inc., San Jose, CA (US)

( * ) Notice: Subject to any disclaimer, the term of this patent is extended or adjusted under 35 U.S.C. 154(b) by 908 days.

(21) Appl. No.: 10/613,751

(22) Filed: Jul. 3, 2003

(51) Int. Cl.
*G06F 15/177* (2006.01)
(52) U.S. Cl. .................. 709/220; 709/217; 709/219; 709/221; 709/222
(58) Field of Classification Search ......... 709/220–222, 709/217–219
See application file for complete search history.

(56) References Cited

U.S. PATENT DOCUMENTS

| | | | | |
|---|---|---|---|---|
| 5,852,722 | A * | 12/1998 | Hamilton | 709/221 |
| 6,012,088 | A * | 1/2000 | Li et al. | 709/220 |
| 6,766,364 | B2 * | 7/2004 | Moyer et al. | 709/221 |
| 7,150,037 | B2 * | 12/2006 | Wolf et al. | 726/6 |
| 7,188,161 | B1 * | 3/2007 | O'Neil et al. | 709/220 |
| 7,290,164 | B1 * | 10/2007 | Harvey et al. | 714/2 |
| 7,363,260 | B1 * | 4/2008 | Stamler et al. | 705/28 |
| 2002/0133573 | A1 * | 9/2002 | Matsuda et al. | 709/220 |
| 2004/0117465 | A1 * | 6/2004 | Bodin et al. | 709/222 |
| 2004/0117466 | A1 * | 6/2004 | Bodin et al. | 709/222 |
| 2005/0182921 | A1 * | 8/2005 | Duncan | 713/1 |
| 2006/0236095 | A1 * | 10/2006 | Smith et al. | 713/153 |
| 2007/0011301 | A1 * | 1/2007 | Ong et al. | 709/224 |

OTHER PUBLICATIONS

Cisco Systems, Inc., "Cisco Router Web Setup Tool (CRWS), Simple Setup for Cisco SOHO Series Broadband Routers," 1992-2002, pp. 1-4.
Cisco Systems, Inc., "Enterprise Class Teleworker CPE Deployment Models," Chapter 3, Enterprise Class Teleworker Solution Reference Network Design (SRND Guide, undated, pp. 3-1-3-8, Jan. 2004.

* cited by examiner

*Primary Examiner*—Saleh Najjar
*Assistant Examiner*—Shawki S Ismail
(74) *Attorney, Agent, or Firm*—Hickman Palermo Truong & Becker LLP

(57) ABSTRACT

A method and apparatus for automatically generating a configuration for a network device is disclosed, comprising the computer-implemented steps of receiving a partial configuration for a network device, wherein the partial configuration comprises a plurality of configuration commands, wherein each of one or more of the configuration commands is associated with one of a plurality of user interface elements; parsing the partial configuration to identify the user interface elements; generating a user interface page based on the user interface elements; receiving one or more configuration parameter values via the user interface page; and substituting the configuration parameter values into the partial configuration to result in creating a complete configuration for the device.

48 Claims, 6 Drawing Sheets

METHOD AND APPARATUS FOR AUTOMATICALLY CONFIGURING A NETWORK DEVICE

FIELD OF THE INVENTION

The present invention generally relates to computer network communications. The invention relates more specifically to a method and apparatus for automatically configuring a network device. Further, techniques providing configuration customization for network service providers are disclosed.

BACKGROUND OF THE INVENTION

The approaches described in this section could be pursued, but are not necessarily approaches that have been previously conceived or pursued. Therefore, unless otherwise indicated herein, the approaches described in this section are not prior art to the claims in this application and are not admitted to be prior art by inclusion in this section.

Network service providers are in the business of providing network service, such as Internet access, to service subscribers. Many network service providers supply a network interface device, such as a residential broadband gateway or router, for use at the customer premises. Such devices may be termed customer premises equipment or "CPE" devices.

In one arrangement, a vendor or manufacturer separate from the service provider manufactures the CPE devices. The vendor or manufacturer loads each CPE device with a set of configuration commands. When a new subscriber arranges for service, either the service provider or the vendor ships a CPE device to the new subscriber. When the subscriber places the CPE device in service, the configuration within the CPE device enables the device to connect to the service provider.

In one approach, the vendor or manufacturer also loads each CPE device with device management software that enables the subscriber to locally configure or troubleshoot the device. The service provider typically works closely with the manufacturer or vendor of the device management software to determine the configuration that is needed for the subscriber to connect to the service provider's network.

However, when a new configuration command or a change in a configuration parameter is introduced, corresponding changes typically also are required in the device management software. Further, different service providers may desire to provide the device management software with a different "look and feel," or may desire to have the device collect and process different configuration parameter values that are supplied by a user. In these cases, technical staff of the service provider must coordinate with the manufacturer of the device management software to arrange for modification of the device management software, because the manufacturer has custody and control of the associated source code, and has the technical staff necessary to accomplish the changes.

Unfortunately, this approach results in delaying the deployment of the updated device management software to the market. In addition, multiple deployments may be needed, which is disruptive to the service provider and its customers. Thus, this approach has significant drawbacks.

Based on the foregoing, there is a clear need for an improved method of applying changes to a device management software application.

There is a particular need for an approach that allows the service provider to implement certain changes in the behavior of the device management software without interacting with the manufacturer of the software, or by implementing the changes exclusively at the service provider's premises before devices are shipped to customer premises. It would be useful if such an approach would be compatible with existing "touchless" configuration and deployment systems.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION OF THE PREFERRED EMBODIMENT

Figure 1A:
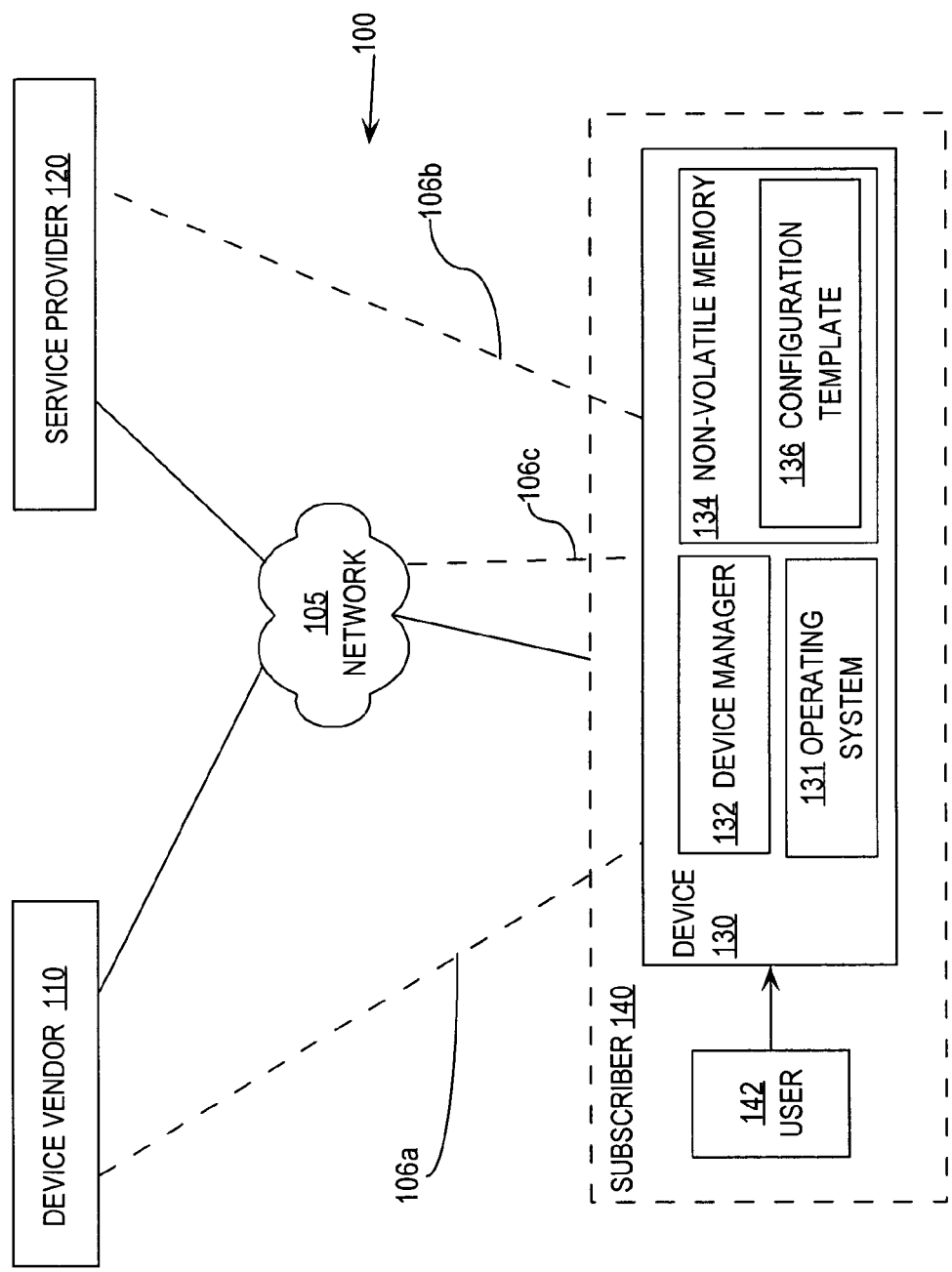
FIG. 1A is a block diagram that illustrates an overview of a network context in which an embodiment may be used.

A method and apparatus for providing automatically generating a network device configuration is described. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

Embodiments are described herein according to the following outline:

1.0 General Overview
2.0 Structural and Functional Overview
3.0 Method of Automatically Generating a Network Device Configuration
4.0 Implementation Mechanisms—Hardware Overview
5.0 Extensions and Alternatives 1.0 General Overview The needs identified in the foregoing Background, and other needs and objects that will become apparent for the following description, are achieved in the present invention, which comprises, in one aspect, a method and apparatus for automatically generating a configuration for a network device. In one embodiment, the method comprises the computer-implemented steps of receiving a partial configuration for a network device, wherein the partial configuration comprises a plurality of configuration commands, wherein each of one or more of the configuration commands is associated with one of a plurality of user interface elements; parsing the partial configuration to identify the user interface elements; generating a user interface page based on the user interface elements; receiving one or more configuration parameter values via the user interface page; and substituting the configuration parameter values into the partial configuration to result in creating a complete configuration for the device.

According to one feature, the partial configuration is stored in non-volatile memory of the network device prior to shipment of the network device to a user. In another feature, the partial configuration comprises an electronic configuration template that is stored in non-volatile memory of the network device prior to shipment of the network device from a service provider or vendor to a user. In yet another feature, the network device comprises a customer premises equipment (CPE) device.

According to another feature, each of the user interface elements comprises a data variable name, a user interface string value, and a data type value. In a related feature, the user interface string value comprises a sequence of characters for display in the user interface page as part of a prompt for entering an associated configuration parameter value. In still another feature, the data type value specifies a data type associated with the user interface element for use in determining validity of the received configuration parameter values. The data type value may be selected from among a set consisting of IP address, subnet mask, dial pattern, virtual channel identifier, virtual path identifier, username, password, gateway, hostname, group name, group key, and peer IP address.

In yet another feature, the partial configuration further comprises one or more dynamic tags that are not associated with user interface elements, and the method further comprises the steps of parsing the partial configuration to identify the dynamic tags, and substituting a configuration parameter value for each of the dynamic tags as part of the complete configuration.

In another feature, each of the user interface elements comprises a user interface string value, and the step of generating a user interface page comprises generating an electronic document that is displayable by an end user computer system that is communicatively coupled to the network device, the electronic document includes the user interface string value; and causing the network device to display the electronic document using the end user computer system. In a related feature, each of the user interface elements comprises a data variable name, a user interface string value, and a data type value, and the method further comprises the steps of generating an electronic document that is displayable by an end user computer system that is communicatively coupled to the network device, the electronic document includes the user interface string value; causing the network device to display the electronic document using the end user computer system; associating one of the configuration parameter values with the data variable name; and determining whether a data type of the one of the configuration parameter values matches the data type value.

In another aspect, a method of enabling a network service provider to customize a configuration of a network device is provided, comprising the computer-implemented steps of creating and storing a partial configuration for a network device within the network device, wherein the partial configuration comprises a plurality of configuration commands, wherein each of one or more of the configuration commands is associated with one of a plurality of user interface elements; and providing the network device with the partial configuration to an end user, wherein setup of the network device causes the network device to perform the steps of parsing the partial configuration to identify the user interface elements; generating a user interface page based on the user interface elements; receiving one or more configuration parameter values via the user interface page; and substituting the configuration parameter values into the partial configuration to result in creating a complete configuration for the device.

In other aspects, the invention encompasses a computer apparatus and a computer-readable medium configured to carry out the foregoing steps.

2.0 Structural and Functional Overview

Figure 1B:
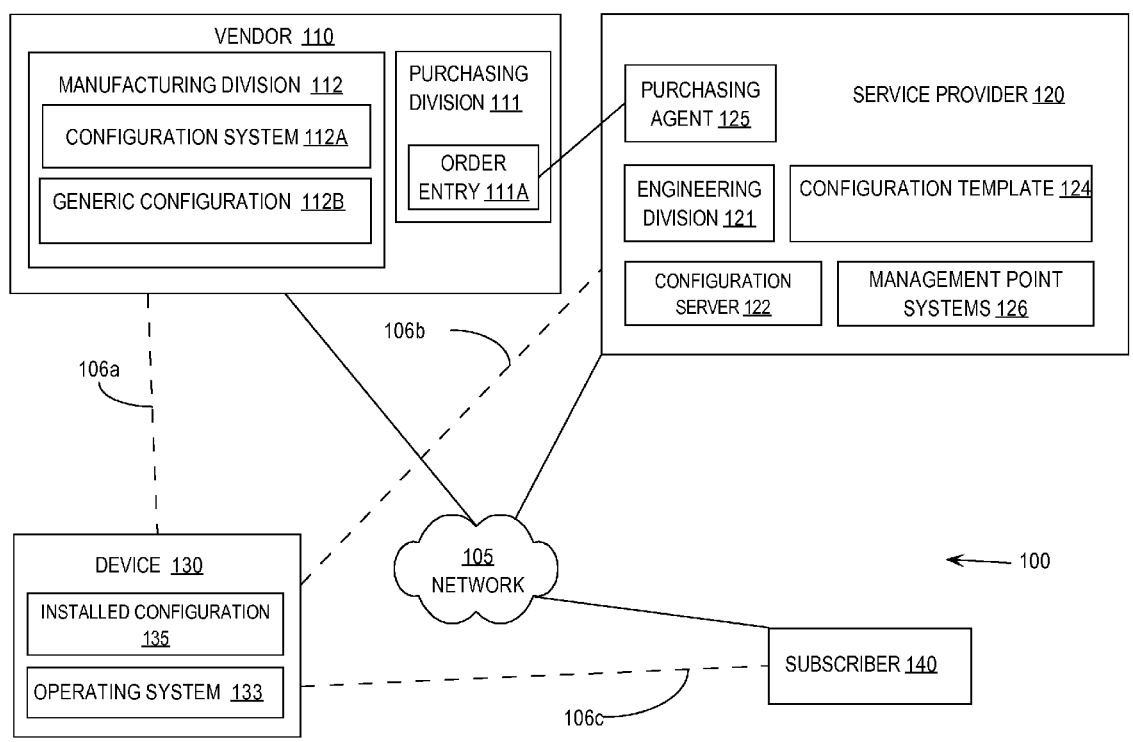
FIG. 1B is a block diagram showing further details of the context of FIG. 1A.

The approaches herein generally relate to automatically generating a network device configuration. FIG. 1A is a block diagram that illustrates an overview of a network context in which an embodiment may be used. FIG. 1B is a block diagram showing further details of the context of FIG. 1A. Referring first to FIG. 1A, a system 100 comprises a Device Vendor 110 of a Device 130, a Service Provider 120 that provides network connectivity for the Device, and a Subscriber Premises 140 at which the Device is located. A user 142 at Subscriber Premises 140 is associated with the Device 130. Although vendors, service providers, and subscribers may order many devices, for the purposes of illustrating a clear example, FIG. 1A includes one such device.

Vendor 110, Service Provider 120, and Subscriber 140 may communicate electronically or through manual means. As one example, Vendor 110 is communicatively coupled to Service Provider 120 and to Subscriber 140 through a network 105, which may comprise one or more local area networks, wide area networks, internetworks, etc. At various times or points in the processes described herein, Device 130 is located within domains of Vendor 110, Service Provider 120, or Subscriber 140, as indicated by dashed lines 106a, 106b, 106c. FIG. 1A shows an arrangement in which Device 130 has been received at Subscriber 140.

Device 130 comprises a Device Manager 132 that executes under supervision and control of an Operating System 131. Device 130 also has non-volatile memory 134 that stores a configuration template 136. In one specific embodiment, Device 130 is a Cisco 800 Series Router from Cisco Systems, Inc., San Jose, Calif. In this embodiment, Operating System 131 is Cisco IOS® Software, and Device Manager 132 is Cisco Router Web Setup. Device 130 also may have many other software applications and hardware elements that are omitted from FIG. 1A for simplicity.

Referring now to FIG. 1B, Device 130 may be initially manufactured by a Manufacturing Division 112 of Vendor 110. At the time of manufacturing, a Configuration System 112A creates and stores a Generic Configuration 112B in Device 130. The stored Generic Configuration 112B may be known as an Installed Configuration 135. The Installed Configuration 135 may include commands for establishing basic connectivity to network 105 or to Service Provider 120. In the approaches herein, the Generic Configuration 112B may comprise a template that is processed, as further described below, to result in creating the Installed Configuration 135.

Vendor 110 may comprise a Purchasing Division 111 to handle orders from Service Provider 120 for Device 130. According to one embodiment, Purchasing Division 111 comprises an Order Entry application 111A for communicating purchasing information from Vendor 110 to Service Provider 120. The Order Entry application 111A is used to receive orders from Service Provider 120 and inform the Service Provider about the status of orders and manufacturing activities.

Configuration System 112A is a mechanism, provided by the Manufacturing Division 112, for the Service Provider 120 to communicate the configuration that the Service Provider 120 wants the Vendor 110 to use as the Installed Configuration 135 for a particular order or Device 130. According to one embodiment, Configuration System 112A is Configuration Express as provided by Cisco Systems, Inc., San Jose, Calif. Service Provider 120 communicates the Generic Configuration 112B to the Vendor 110 through Configuration System 112A. According to one embodiment, the Generic Configuration 112B is a bootstrap configuration that is loaded as the Installed Configuration 135 of Device 130 when manufacturing of Device 130 is complete.

According to one embodiment, the Generic Configuration 112B comprises a bootstrap configuration. The Generic Configuration 112B contains instructions which, when executed by Device 130, enable the Device to determine which of several line cards or interfaces in the Device can communicate through network 105 to Configuration Server 122. Specific processes for self-discovering a connected interface are described further below.

In one embodiment, Service Provider 120 comprises an Engineering Division 121, a Purchasing Agent 125, a Configuration Template 124, a Configuration Server 122, and Management Point Systems 126. Engineering Division 121 defines the Generic Configuration 112B and communicates the Generic Configuration 112B to the Vendor 110 with the Configuration System 112A. Alternatively, Engineering Division 121 defines the Configuration Template 124 and communicates it to Vendor 110 for loading into Device 130 as part of manufacturing.

According to one embodiment, Purchasing Agent 125 places an order with the Vendor 112 for a device to be used by Subscriber 140.

According to one embodiment, Configuration Template 124 is a partially complete configuration that the Service Provider 120 specifically wants installed as the Installed Configuration 135 for Device 130 for Subscriber 140. For example, the Configuration Template 124 may contain commands that are associated with user interface prompts and related user interface information specific to Service Provider 120 or specific to an operating environment or business environment of Subscriber 140. The Configuration Template 124 contains one or more commands with user interface elements or elements. Values received from the user are substituted into the template to result in creating a final device configuration.

Thus, while the Generic Configuration 112B may be sufficient for initial configuration of all devices deployed by any service provider, a particular Service Provider 120 may wish to provide a particular configuration or user interface for a particular Subscriber 140 or for all its subscribers. In an embodiment, the user interface of a device manager executed by Device 130 is driven based on the Configuration Template 124. Further, a final device configuration for Device 130 is created based on populating the Configuration Template 124 with values received from a user in response to prompts or other user interface information that is defined in the Configuration Template. Specific mechanisms for generating a user interface, receiving values, substituting values and generating a final configuration based on a template are described further below.

According to one embodiment, Configuration Template 124 contains one or more configuration commands that are associated with tags. The tags specify a data variable name, a user interface prompt string, and a data type. Using mechanisms described further below, the Device Manager 132 processes Configuration Template 124 by generating one or more user interface pages that include the user interface prompt strings. Configuration parameter values that match the data type are temporarily stored in the data variables. A final configuration for the Device 130 is created by substituting the received configuration parameter values into the Configuration Template 124. The final configuration is stored in Device 130 and is applied to the device as the Installed Configuration 135.

According to one embodiment, Device 130 then contacts Configuration Server 122 and receives further configuration information, if necessary or appropriate. According to one embodiment, the Configuration Server 122 is the Cisco CNS 2100 Series Intelligence Engine, from Cisco Systems, Inc.

According to one embodiment, Management Point Systems 126 are systems that are interested in Device 130, its inventory, or information that it generates. Examples of Management Point Systems 126 include, but are not limited to, billing systems, provisioning systems, and fault detection systems. As depicted, Management Point Systems 126 are part of Service Provider 120, however, Management Point Systems 126 may be any systems that are informed when inventory in Device 130 changes or when other events of interest occur with respect to the Device.

Restated more generally, a network device is manufactured at a manufacturing location. During the manufacturing process, a partial configuration, or generic configuration template, is stored in non-volatile device memory. The generic configuration template comprises certain configuration commands that are associated with user interface elements. Each of the user interface elements consists of a set of tags that define a data variable, and text for a user interface page that prompts a user to enter a value for the data variable.

When the device is placed in service, a configuration manager in the device reads the generic configuration template and dynamically creates and populates a user interface page using the text component of the user interface elements. The user interface page is displayed to the user on a display of a computer system that is coupled to the router. The user enters one or more configuration parameter values using the user interface. A final device configuration is generated based on substituting the user parameter values into the configuration template. The final device configuration is stored in the device and applied to the device. The device then operates according to the final device configuration.

In one specific approach, a configuration template file is stored in flash memory of a router. A device management tool reads the configuration template and parses it to identify user interface strings. The parsed strings are used to generate the user interface. The parsed strings identify configuration parameter values that the user is required to enter as part of initially placing the device in service. Once the user enters values for the configuration parameters, the device management tool substitutes the user-entered values into the configuration template and generates the complete configuration.

In one embodiment, a device is shipped to a network service provider, such as an ISP, with a default generic configuration template. The service provider can modify the generic configuration template to create a new generic configuration template that reflects specific preferences of the service provider. In this approach, the user interface string values in the generic configuration template typically reflect specific preferences of the service provider, or specific information that the service provider wishes to display to the user. The default configuration provided by the device management tool is replaced with the new customized configuration generated based on the template file provided by the service provider.

Using these approaches, service providers can deploy new configurations to large numbers of users without having to re-build the device management tool. By changing only the generic configuration template file, the behavior of the device management tool is automatically modified. For example, a user interface specific to the service provider is generated.

Further, the custom configuration based template file may be placed outside the build package of the device management tool, and loaded directly into the non-volatile memory of the device. This helps the service provider to deploy the new configuration easily, without support from the vendor that created the management tool. For example, the service provider can place the template on one of its servers, and request its customers to download the template to the nonvolatile memory of the device. Thus, the service provider avoids having to provide personalized service, or a "truck roll," to accomplish a configuration change.

3.0 Method of Automatically Generating a Network Device Configuration

Figure 2:
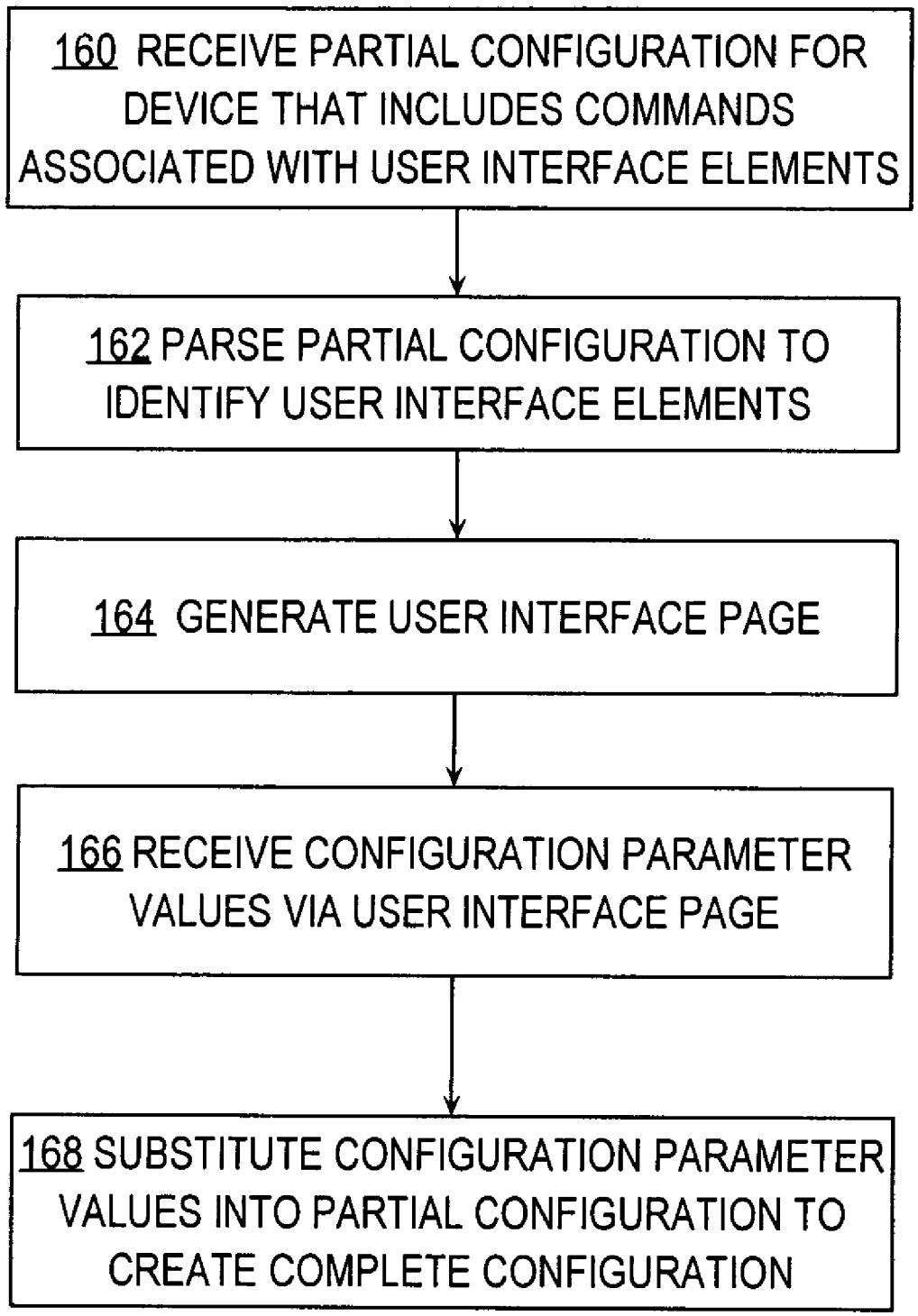
FIG. 2 is a flow diagram that illustrates a high level overview of one embodiment of a method for automatically configuring a network device.

FIG. 2 is a flow diagram that illustrates a high level overview of one embodiment of a method for automatically configuring a network device. FIG. 2 represents steps that could be performed by Device Manager 132 of Device 130 of FIG. 1A, for example. The steps of FIG. 2 may be performed by any suitable mechanism, including software, hardware, firmware, or a combination thereof.

In block 160, a partial configuration for a network device is received. The partial configuration includes one or more commands that are associated with user interface elements. For example, the user interface elements may be data variable and user interface string tags, as described further below.

In block 162, the partial configuration is parsed to identify the user interface elements. For example, the partial configuration is scanned to identify all user interface tags, user interface prompts or other information are extracted from the tags, and the prompts or other information are temporarily stored.

In block 164, a user interface page is generated. In one embodiment, Device Manager 132 generates HTML documents as its user interface, which a Web server in Device 130 serves to a computer system of User 142. A browser executed by the computer system displays the HTML documents. Therefore, block 164 may involve retrieving an HTML template for a configuration page of a user interface associated with the Device Manager 132, inserting one or more user interface prompt strings or other information into the template, and dynamically creating a final HTML user interface page that includes the prompt strings or other information.

In block 166, one or more configuration parameters are received through the user interface page. For example, a user enters one or more configuration parameter values in response to prompts in the user interface page, and selects a Submit button or an equivalent user interface widget. In response, the browser submits the parameter values to the Web server of Device 130, which passes the parameter values to Device Manager 132.

In block 168, the configuration parameter values are substituted into the partial configuration to create a complete configuration. As a result, a device acquires a complete configuration that includes the parameter values that are entered. The complete configuration may be applied to the device, enabling the device to operate as expected by the service provider.

Figure 3:
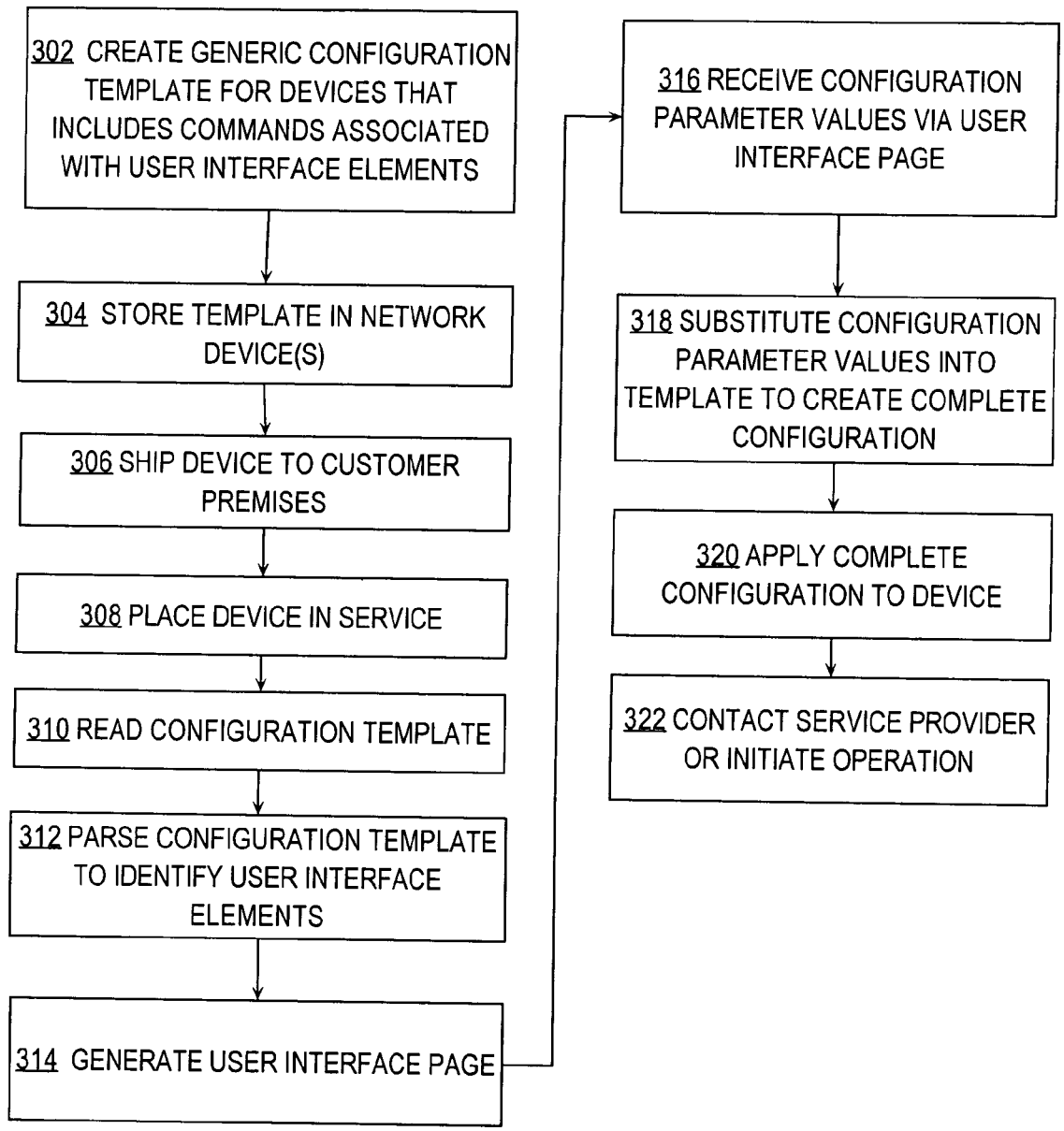
FIG. 3 is a flow diagram that illustrates another embodiment of a method for automatically configuring a network device.

FIG. 3 is a flow diagram that illustrates another embodiment of a method for automatically configuring a network device. The process of FIG. 3 shows additional steps that are performed by elements other than the Device Manager. For purposes of illustrating a clear example, the process of FIG. 3 is described herein with reference to FIG. 4, which is a block diagram of the network context of FIG. 1A showing messages and communications that are carried out as part of performing the process of FIG. 3.

Referring first to FIG. 3, in block 302, a generic configuration template is created for network devices; the configuration template includes commands that are associated with user interface elements. According to one specific embodiment, a configuration template file comprises one or more template file tags and one or more dynamic tags. A template file tag is a set of string values that are delimited by the characters '<' and '>'. In an example embodiment, a template file tag is an association of a Data Variable, GUI String, Data Type, and Settings Type. For example, a configuration template file could comprise a line of the form:

dns-server<PRIMARY_DNS_SERVER, "Primary DNS Server Address", IPAddress, "General Settings">

In this example, "dns-server" is a network device configuration command, PRIMARY_DNS_SERVER denotes a data variable, "Primary DNS Server Address" is a string value associated with the variable that will be displayed in a user interface page to prompt the user to enter the value, IPAddress is a data type of the variable, and General Settings is a settings type.

The Data Variable is a variable tag that stores the value entered by the user. It names a storage variable for the user-entered data. The configuration template may reference a Data Variable any number of times in lines appearing after the first appearance of the Data Variable in a template file tag. For example, if a configuration template contains the following template file tag, dns-server<PRIMARY_DNS_SERVER, "Primary DNS Server Address", IPAddress, "General Settings"> then a subsequent line of the configuration template could contain a line referencing the Data Variable, such as:

ip name-server<PRIMARY_DNS_SERVER>

Within a template file tag, the GUI String component specifies a text string that is displayed in a setup user interface page that is generated and displayed by a setup application executed in the network device. An example of a suitable setup application is Cisco Router Web Setup, which is commercially available from Cisco Systems, Inc., San Jose, Calif., and typically provided with CPE router devices such as residential or small business broadband routers.

The GUI String is displayed as part of a setup user interface page, as described further below. In one embodiment, the GUI String comprises about 30 characters including special characters and white space characters. A service provider may place any desired text or information in a GUI String in a particular template file tag. Thus, the use of the GUI String in combination with the other approaches described herein enable a service provider to customize the appearance of a user interface that provides network device setup functions.

The Data Type component or tag specifies the type of the associated Data Variable. The setup application uses the value of the Data Type component to determine whether a configuration parameter value entered by a user matches the specified data type. Using this approach, the setup application can trap data entry errors by the user and prompt the user to re-enter data, if appropriate.

The Settings Type tag may specify a class or type of settings associated with the Data Variable. Alternatively, in one embodiment, the Settings Type tag is omitted.

The Data Type tag can specify that the Data Variable is optional. In one embodiment, when the Data Type tag has the suffix "_Optional," then the Data Variable is optional. In one specific embodiment, the Data Type is selected from a set consisting of the values shown in Table 1:

TABLE 1

EXAMPLE DATA TYPE VALUES

| Data Type | Description | Examples |
| --- | --- | --- |
| IPAddress | This says the data variable is an IP Address field | 10.10.10.1 |
| IPAddress_Optional | This says the data variable is an IP Address field. But this is considered as an optional field and user can proceed without entering any values. | Can be empty or any valid IP address |
| SubnetMask | This says the data variable is an subnet mask field | Valid subnet mask like 255.255.0.0 |
| DialPattern | Dial Pattern for voice | 123232 |
| DialPattern_Optional | Optional field for voice dial pattern. | Can be empty. |
| VCI | ATM Virtual Channel Identifier | 8 |
| VPI | ATM Virtual Path Identifier | 35 |
| Username | PPP Username | Tommy |
| Password | PPP Password (Should be followed by ConfirmPassword data type. Always appears in "*" for every character user types.) | Max |
| ConfirmPassword | PPP Confirm Password. This tag is used to re confirm the entered password. User should enter the same values in both Password and Confirm Password fields. | Should be same as password entered. |
| Gateway | Gate way address | 192.135.243.2 |
| Hostname | Hostname for DHCP Option 12 | ATT |
| Groupname | Group name for Easy VPN | Mark |
| Groupkey | Group Key for Easy VPN. (This data type is always followed Confirmgroupkey. Always appears in "*"). | Lab |
| Confirmgroupkey | Confirm Group key, this does the similar function of Confirm Password. | Same as group key |
| PeerIPAddress | Peer ip address for Easy VPN. | 172.16.10.2 |
| Gateway_Optional | This is optional field for the Gateway | |
| Hostname_Optional | This is optional field for the Host name | |

Figure 4:
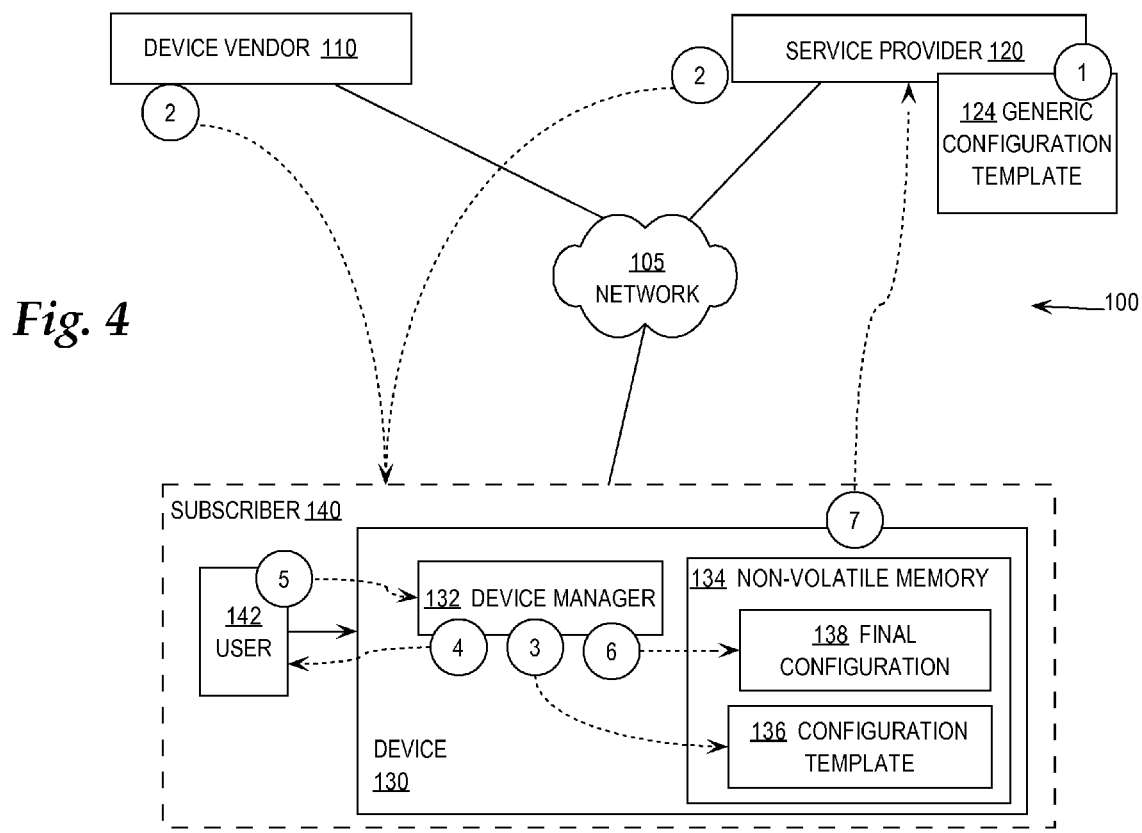
FIG. 4 is a block diagram of the network context of FIG. 1A showing messages and communications that are carried out as part of performing the process of FIG. 2.

Referring now to FIG. 4, in one approach, Service Provider 120 creates the generic template 124, as indicated by numeral 1. In block 304, the generic configuration template is stored in one or more network devices. The generic configuration template may be stored by Vendor 110 in devices that the vendor makes for the Service Provider 120 and later "drop ships" directly to customer premises. Alternatively, Vendor 110 may ship devices having a default configuration to a warehouse or other facility of the Service Provider, and the Service Provider may install the generic configuration template in such devices as part of readying the devices for shipment. The generic configuration template 136 is shown in Device 130 in FIG. 4.

In block 306, a device is shipped to customer premises. As shown by numeral 2 of FIG. 4, shipment may involve "drop shipment" from Vendor 110 to Subscriber 140, or shipment from Service Provider 120 to Subscriber 140. In block 308, the device is placed in service. For example, User 142 sets up Device 130 and applies power, which causes the device to initiate a boot process.

In block 310, the configuration template is read. For example, Device Manager 132 reads Configuration Template 136, as shown by numeral 3 in FIG. 4. In block 312, the configuration template is parsed to identify user interface elements. Such parsing may involve the same process as described above for block 162 of FIG. 2.

In block 314, a user interface page is generated. Block 314 may involve the same page generation techniques described above for block 164 of FIG. 2. The resulting user interface page may be served to the user, as indicated by numeral 4 of FIG. 4. In block 316, configuration parameter values are received via the user interface page. Block 316 may involve the same techniques described above for block 166 of FIG. 2. Numeral 5 of FIG. 4 represents Device Manager 132 receiving configuration parameter values from a user.

In block 318, the configuration parameter values are substituted into the generic configuration template to create a complete configuration. The techniques described above for block 168 may be used. Numeral 6 of FIG. 4 represents performing value substitution to result in generating a Final Configuration 138. In block 320, the complete configuration is applied to the device.

In block 322, the device contacts a service provider or otherwise initiates operation, as represented by numeral 7 of FIG. 4.

In one embodiment, the configuration template also may include dynamic tags, which are elements of a configuration template that are not associated with configuration parameter values that are entered by a user. Dynamic tags designate values that are determined dynamically by the setup application, and substituted into the final configuration. In one embodiment, dynamic tags are delimited by single quotation marks.

Dynamic tags enable a service provider to specify values in a configuration template that are dynamically determined when the network device is running, and then substituted into the final configuration. For example, a dynamic tag may be provided in a configuration template file to cause dynamic updating of an Ethernet IP address. As a specific example, a configuration template includes the line:

default-router 'E0IPAddress'.

When this line is processed, the setup application executed by the network device dynamically substitutes into the configuration the value of the Ethernet IP address that is then currently used by the network device.

In one specific embodiment, the setup application can process the dynamic tags specified in Table 2. In other embodiments, other dynamic tags may be processed.

TABLE 2

EXAMPLE DYNAMIC TAGS

| Date Type | Description |
| --- | --- |
| 'E0IPAddress' | Ethernet IP Address will be substituted. If the E0 ip address is changed the changed ip address will be configured. |
| 'E0Mask' | Ethernet Subnet mask will be substituted. If the E0 ip address is changed the changed mask will be configured. |
| 'Nat$_{13}$ AccessList_Number' | NAT access list number |
| 'Network_Address_InverseMask' | Network address and inverse mask together |

Using the approaches described herein, a configuration template file having any desired contents may be created. The configuration template file may include any configuration command that is supported by the network device that uses the final configuration that is created from the configuration template file. Table 3 provides a complete example of a configuration template that is appropriate for use with a network device that uses PPPoE for authentication in a VPN context. Of course, any other form of configuration template may be created using the approaches herein.

TABLE 3

EXAMPLE TEMPLATE CONFIGURATION

! Cisco IOS router configuration file
! Designed for Cisco 806
! Cisco Router Web Setup Template
!
!
! removing ConfigExp.cfg commands delivered for 806
no ip nat inside source list 'Nat_AccessList_Number' interface Ethernet1
overload
no access-list 'Nat_AccessList_Number' permit ip 'Network_Address_InverseMask' any
!
!
ip dhcp excluded-address 'E0IPAddress'
!
ip dhcp pool CLIENT
no import all
import all
network 'Network_Address' 'E0Mask'
default-router 'E0IPAddress'
!
!

TABLE 3-continued

EXAMPLE TEMPLATE CONFIGURATION no ip name-server
ip domain-lookup
ip ssh time-out 120
ip ssh authentication-retries 3
vpdn enable
!
vpdn-group 1
request-dialin
protocol pppoe
!
!
!
crypto ipsec client ezvpn crws-client
group <GROUPNAME, "Group Name", groupname, "General Settings"> key <GROUPKEY, "Group Password", groupkey, "General Settings"><CONFIRMGROUPPASSWORD, "Confirm Group Password", Confirmgroupkey, "General Settings">
mode client
peer <PEERIPADDRESS, "Peer IP Address", PeerIPAddress, "General Settings">
!
!
interface Ethernet0
ip tcp adjust-mss 1348
no cdp enable
no ip nat inside
hold-queue 32 in
hold-queue 100 out
!
interface Ethernet1
no ip address
pppoe enable
pppoe-client dial-pool-number 1
no ip nat outside
no cdp enable
!
interface Dialer1
ip address negotiated
ip mtu 1492
encapsulation ppp
ip tcp adjust-mss 1348
dialer pool 1
dialer-group 1
no ip nat outside
ppp authentication chap pap callin
ppp pap sent-username <USERNAME, "User Name", username, "General Settings"> password <PASSWORD, "Password", Password, "General Settings"><CONFIRMPASSWORD, "Confirm Password", ConfirmPassword , "General Settings">
ppp chap hostname <USERNAME>
ppp chap password <PASSWORD>
ppp ipcp dns request
ppp ipcp wins request
crypto ipsec client ezvpn crws-client
!
ip classless
ip route 0.0.0.0.0.0.0.0 Dialer1
ip http server
!
dialer-list 1 protocol ip permit
!
end The general approaches herein are adaptable to many kinds of network devices, configuration management tools, and configuration formats. Although the technology described herein has been developed by Cisco Systems, Inc. for its products, the approaches herein are generally applicable to the products of other makers of network devices.

In one specific embodiment, the configuration management tool is Cisco Router Web Setup (CRWS); further, the partial configuration is a configuration template file that contains all the Cisco IOS commands needed to configure a CPE router configuration. A service provider, such as an ISP, can edit the configuration template file to customize prompts and other text that appears in a graphical user interface, such as in the CRWS Quick Setup user interface pages. For example, an ISP can create a file named ISP.cfg based on the approaches herein and can place the created file with other CRWS files in non-volatile memory of a router. The CRWS Quick Setup GUI is then generated based on the template tags given in the ISP.cfg file, and the resulting final configuration is based on the contents of the ISP.cfg file.

4.0 Implementation Mechanisms—Hardware Overview

Figure 5:
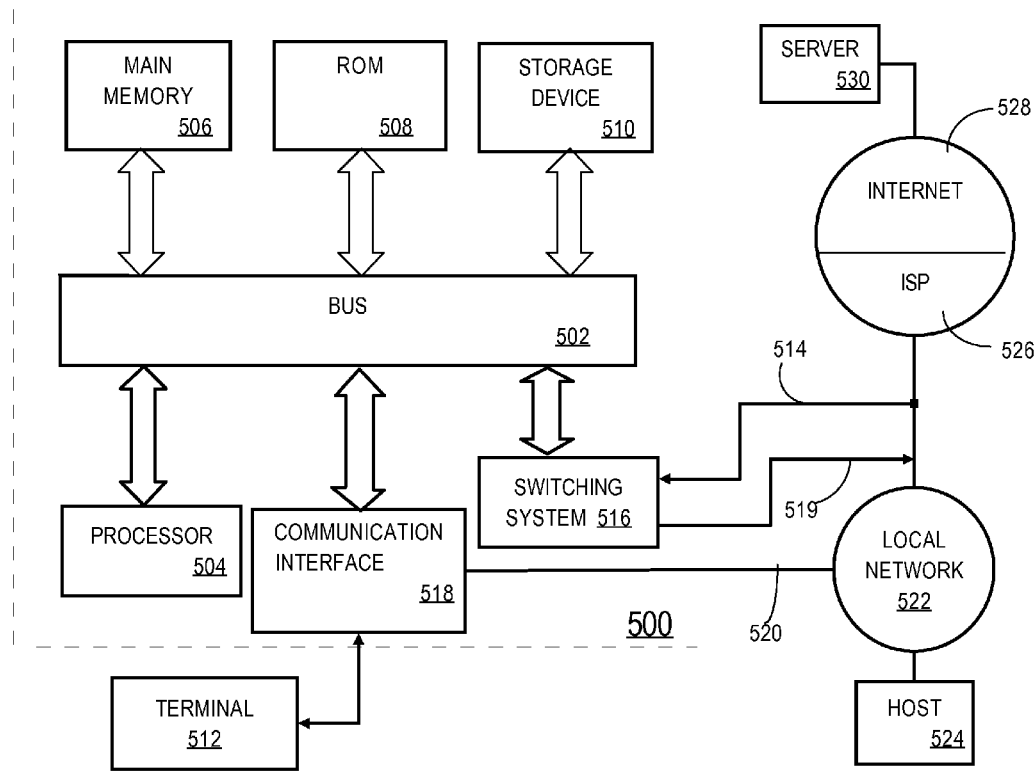
FIG. 5 is a block diagram that illustrates a computer system upon which an embodiment may be implemented.

FIG. 5 is a block diagram that illustrates a computer system 500 upon which an embodiment of the invention may be implemented. The preferred embodiment is implemented using one or more computer programs running on a network element such as a router device. Thus, in this embodiment, the computer system 500 is a router.

Computer system 500 includes a bus 502 or other communication mechanism for communicating information, and a processor 504 coupled with bus 502 for processing information. Computer system 500 also includes a main memory 506, such as a random access memory (RAM), flash memory, or other dynamic storage device, coupled to bus 502 for storing information and instructions to be executed by processor 504. Main memory 506 also may be used for storing temporary variables or other intermediate information during execution of instructions to be executed by processor 504. Computer system 500 further includes a read only memory (ROM) 508 or other static storage device coupled to bus 502 for storing static information and instructions for processor 504. A storage device 510, such as a magnetic disk, flash memory or optical disk, is provided and coupled to bus 502 for storing information and instructions.

A communication interface 518 may be coupled to bus 502 for communicating information and command selections to processor 504. Interface 518 is a conventional serial interface such as an RS-232 or RS-422 interface. An external terminal 512 or other computer system connects to the computer system 500 and provides commands to it using the interface 514. Firmware or software running in the computer system 500 provides a terminal interface or character-based command interface so that external commands can be given to the computer system.

A switching system 516 is coupled to bus 502 and has an input interface 514 and an output interface 519 to one or more external network elements. The external network elements may include a local network 522 coupled to one or more hosts 524, or a global network such as Internet 528 having one or more servers 530. The switching system 516 switches information traffic arriving on input interface 514 to output interface 519 according to pre-determined protocols and conventions that are well known. For example, switching system 516, in cooperation with processor 504, can determine a destination of a packet of data arriving on input interface 514 and send it to the correct destination using output interface 519. The destinations may include host 524, server 530, other end stations, or other routing and switching devices in local network 522 or Internet 528.

The invention is related to the use of computer system 500 for automatically generating a configuration for a network device, and for providing configuration customization for network service providers. According to one embodiment of the invention, automatically generating a configuration for a network device, or providing configuration customization for network service providers, is provided by computer system 500 in response to processor 504 executing one or more sequences of one or more instructions contained in main memory 506. Such instructions may be read into main memory 506 from another computer-readable medium, such as storage device 510. Execution of the sequences of instructions contained in main memory 506 causes processor 504 to perform the process steps described herein. One or more processors in a multi-processing arrangement may also be employed to execute the sequences of instructions contained in main memory 506. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 504 for execution. Such a medium may take many forms, including but not limited to, non-volatile media, volatile media, and transmission media. Non-volatile media includes, for example, optical or magnetic disks, such as storage device 510. Volatile media includes dynamic memory, such as main memory 506. Transmission media includes coaxial cables, copper wire and fiber optics, including the wires that comprise bus 502. Transmission media can also take the form of acoustic or light waves, such as those generated during radio wave and infrared data communications.

Common forms of computer-readable media include, for example, a floppy disk, a flexible disk, hard disk, magnetic tape, or any other magnetic medium, a CD-ROM, any other optical medium, punch cards, paper tape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 504 for execution. For example, the instructions may initially be carried on a magnetic disk of a remote computer. The remote computer can load the instructions into its dynamic memory and send the instructions over a telephone line using a modem. A modem local to computer system 500 can receive the data on the telephone line and use an infrared transmitter to convert the data to an infrared signal. An infrared detector coupled to bus 502 can receive the data carried in the infrared signal and place the data on bus 502. Bus 502 carries the data to main memory 506, from which processor 504 retrieves and executes the instructions. The instructions received by main memory 506 may optionally be stored on storage device 510 either before or after execution by processor 504.

Communication interface 518 also provides a two-way data communication coupling to a network link 520 that is connected to a local network 522. For example, communication interface 518 may be an integrated services digital network (ISDN) card or a modem to provide a data communication connection to a corresponding type of telephone line. As another example, communication interface 518 may be a local area network (LAN) card to provide a data communication connection to a compatible LAN. Wireless links may also be implemented. In any such implementation, communication interface 518 sends and receives electrical, electromagnetic or optical signals that carry digital data streams representing various types of information.

Network link 520 typically provides data communication through one or more networks to other data devices. For example, network link 520 may provide a connection through local network 522 to a host computer 524 or to data equipment operated by an Internet Service Provider (ISP) 526. ISP 526 in turn provides data communication services through the worldwide packet data communication network now commonly referred to as the "Internet" 528. Local network 522 and Internet 528 both use electrical, electromagnetic or optical signals that carry digital data streams. The signals through the various networks and the signals on network link 520 and through communication interface 518, which carry the digital data to and from computer system 500, are exemplary forms of carrier waves transporting the information.

Computer system 500 can send messages and receive data, including program code, through the network(s), network link 520 and communication interface 518. In the Internet example, a server 530 might transmit a requested code for an application program through Internet 528, ISP 526, local network 522 and communication interface 518. In accordance with the invention, one such downloaded application provides for automatically generating a configuration for a network device, or providing configuration customization for network service providers as described herein.

The received code may be executed by processor 504 as it is received, and/or stored in storage device 510, or other non-volatile storage for later execution. In this manner, computer system 500 may obtain application code in the form of a carrier wave.

5.0 Extensions and Alternatives

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:

1. A method of automatically generating a configuration for a network device, the method comprising the computer-implemented steps of:

receiving a partial configuration for a network device, wherein the partial configuration comprises a plurality of configuration commands, wherein each of one or more of the configuration commands is associated with one of a plurality of user interface elements;

parsing the partial configuration to identify the user interface elements;

generating a local user interface page from a user based on the user interface elements;

receiving one or more configuration parameter values via the user interface page;

substituting the configuration parameter values into the partial configuration to result in creating a complete configuration for the device;

wherein the partial configuration is at least partially customized with one or more configuration parameter values specific to a network service provider prior to shipment of the network device to a user;

wherein each of the user interface elements comprises a data variable name and a user interface string value;

generating an electronic document that is displayable by an end user computer system that is communicatively coupled to the network device, wherein the electronic document includes the user interface string value;

causing the network device to display the electronic document using the end user computer system;

associating one of the configuration parameter values with the data variable name;

wherein each of the user interface elements farther comprises a data type value; and determining whether a data type of the one of the configuration parameter values matches the data type value.

2. A method as recited in claim 1, wherein the partial configuration is stored in non-volatile memory of the network device prior to shipment of the network device to a user.

3. A method as recited in claim 1, wherein the partial configuration comprises an electronic configuration template that is stored in non-volatile memory of the network device prior to shipment of the network device from a service provider or vendor to a user.

4. A method as recited in claim 1, wherein the network device comprises a customer premises equipment (CPE) device.

5. A method as recited in claim 1, wherein the user interface string value comprises a sequence of characters for display in the user interface page as part of a prompt for entering an associated configuration parameter value.

6. A method as recited in claim 1, wherein the data type value specifies a data type associated with the user interface element for use in determining validity of the received configuration parameter values.

7. A method as recited in claim 6, wherein the data type value is selected from among a set consisting of IP address, subnet mask, dial pattern, virtual channel identifier, virtual path identifier, username, password, gateway, hostname, group name, group key, and peer IP address.

8. A method as recited in claim 1, wherein the partial configuration further comprises one or more dynamic tags that are not associated with user interface elements, and wherein the method further comprises the steps of:

parsing the partial configuration to identify the dynamic tags;

substituting a configuration parameter value for each of the dynamic tags as part of the complete configuration.

9. A method of automatically generating a network device configuration, the method comprising the computer-implemented steps of:

reading a configuration template from non-volatile memory of a network device, wherein the configuration template comprises a plurality of configuration commands, wherein each of one or more of the configuration commands is associated with one of a plurality of user interface elements, wherein the configuration template is stored in the memory prior to movement of the network device from a vendor or service provider to a user;

parsing the configuration template to identify one or more user interface elements;

generating a local user interface page based on the user interface elements;

receiving one or more configuration parameter values from a user of the network device via the user interface page;

substituting the configuration parameter values into the configuration template in association with the configuration commands to result in creating and storing a complete configuration for the device;

wherein the configuration template is at least partially customized with one or more configuration parameter values specific to a network service provider;

wherein each of the user interface elements comprises a data variable name and a user interface string value;

generating an electronic document that is displayable by an end user computer system that is communicatively coupled to the network device, wherein the electronic document includes the user interface string value;

causing the network device to display the electronic document using the end user computer system;

associating one of the configuration parameter values with the data variable name;

wherein each of the user interface elements further comprises a data type value; and determining whether a data type of the one of the configuration parameter values matches the data type value.

10. A method as recited in claim 9, wherein the network device comprises a customer premises equipment (CPE) device.

11. A method as recited in claim 9, wherein the user interface string value comprises a sequence of characters for display in the user interface page as part of a prompt for entering an associated configuration parameter value.

12. A method as recited in claim 9, wherein the data type value specifies a data type associated with the user interface element for use in determining validity of the received configuration parameter values.

13. A method as recited in claim 12, wherein the data type value is selected from among a set consisting of IP address, subnet mask, dial pattern, virtual channel identifier, virtual path identifier, username, password, gateway, hostname, group name, group key, and peer IP address.

14. A method as recited in claim 9, wherein the configuration template further comprises one or more dynamic tags that are not associated with user interface elements, and wherein the method further comprises the steps of:

parsing the configuration template to identify the dynamic tags;

substituting a configuration parameter value for each of the dynamic tags as part of the complete configuration.

15. A computer-readable storage medium carrying one or more sequences of instructions for automatically generating a configuration for a network device, which instructions, when executed by one or more processors, cause the one or more processors to carry out the steps of:

receiving a partial configuration for a network device, wherein the partial configuration comprises a plurality of configuration commands, wherein each of one or more of the configuration commands is associated with one of a plurality of user interface elements;

parsing the partial configuration to identify the user interface elements;

generating a local user interface page based on the user interface elements;

receiving one or more configuration parameter values via the user interface page;

substituting the configuration parameter values into the partial configuration to result in creating a complete configuration for the device;

wherein the partial configuration is at least partially customized with one or more configuration parameter values specific to a network service provider prior to shipment of the network device to a user;

wherein each of the user interface elements comprises a data variable name and a user interface string value;

generating an electronic document that is displayable by an end user computer system that is communicatively coupled to the network device, wherein the electronic document includes the user interface string value;

causing the network device to display the electronic document using the end user computer system;

associating one of the configuration parameter values with the data variable name;

wherein each of the user interface elements further comprises a data type value; and determining whether a data type of the one of the configuration parameter values matches the data type value.

16. A computer-readable medium as recited in claim 15, wherein the partial configuration is stored in non-volatile memory of the network device prior to shipment of the network device to a user.

17. A computer-readable medium as recited in claim 15, wherein the partial configuration comprises an electronic configuration template that is stored in non-volatile memory of the network device prior to shipment of the network device from a service provider or vendor to a user.

18. A computer-readable medium as recited in claim 15, wherein the network device comprises a customer premises equipment (CPE) device.

19. A computer-readable medium as recited in claim 15, wherein the data type value specifies a data type associated with the user interface element for use in determining validity of the received configuration parameter values.

20. A computer-readable medium as recited in claim 19, wherein the data type value is selected from among a set consisting of IP address, subnet mask, dial pattern, virtual channel identifier, virtual path identifier, username, password, gateway, hostname, group name, group key, and peer IP address.

21. A computer-readable medium as recited in claim 15, wherein the partial configuration further comprises one or more dynamic tags that are not associated with user interface elements, and wherein the method further comprises the steps of:

parsing the partial configuration to identify the dynamic tags;

substituting a configuration parameter value for each of the dynamic tags as part of the complete configuration.

22. A computer-readable medium as recited in claim 15, wherein the step of generating a user interface page comprises the steps of:

generating an electronic document that is displayable by an end user computer system that is communicatively coupled to the network device, wherein the electronic document includes the user interface string value; and causing the network device to display the electronic document using the end user computer system.

23. An apparatus for automatically generating a configuration for a network device, comprising:

means for computing comprising a communication mechanism for communicating information, and a processor coupled with the communication mechanism for processing information;

means for receiving a partial configuration for a network device, wherein the partial configuration comprises a plurality of configuration commands, wherein each of one or more of the configuration commands is associated with one of a plurality of user interface elements;

means for parsing the partial configuration to identify the user interface elements;

means for generating a local user interface page based on the user interface elements;

means for receiving one or more configuration parameter values via the user interface page;

means for substituting the configuration parameter values into the partial configuration to result in creating a complete configuration for the device;

wherein the partial configuration is at least partially customized with one or more configuration parameter values specific to a network service provider prior to shipment of the network device to a user;

wherein each of the user interface elements comprises a data variable name and a user interface string value;

means for generating an electronic document that is displayable by an end user computer system that is communicatively coupled to the network device, wherein the electronic document includes the user interface string value;

means for causing the network device to display the electronic document using the end user computer system;

means for associating one of the configuration parameter values with the data variable name;

wherein each of the user interface elements further comprises a data type value; and means for determining whether a data type of the one of the configuration parameter values matches the data type value.

24. An apparatus as recited in claim 23, wherein the partial configuration is stored in non-volatile memory of the network device prior to shipment of the network device to a user.

25. An apparatus as recited in claim 23, wherein the partial configuration comprises an electronic configuration template that is stored in non-volatile memory of the network device prior to shipment of the network device from a service provider or vendor to a user.

26. An apparatus as recited in claim 23, wherein the network device comprises a customer premises equipment (CPE) device.

27. An apparatus as recited in claim 23, wherein the user interface string value comprises a sequence of characters for display in the user interface page as part of a prompt for entering an associated configuration parameter value.

28. An apparatus as recited in claim 23, wherein the data type value specifies a data type associated with the user interface element for use in determining validity of the received configuration parameter values.

29. An apparatus as recited in claim 28, wherein the data type value is selected from among a set consisting of IP address, subnet mask, dial pattern, virtual channel identifier, virtual path identifier, username, password, gateway, hostname, group name, group key, and peer IP address.

30. An apparatus as recited in claim 23, wherein the partial configuration further comprises one or more dynamic tags that are not associated with user interface elements, and further comprising:

means for parsing the partial configuration to identify the dynamic tags;

means for substituting a configuration parameter value for each of the dynamic tags as part of the complete configuration.

31. An apparatus as recited in claim 23, wherein each of the user interface elements comprises a user interface string value, and wherein the generating means comprises:

means for generating an electronic document that is displayable by an end user computer system that is communicatively coupled to the network device, wherein the electronic document includes the user interface string value; and means for causing the network device to display the electronic document using the end user computer system.

32. An apparatus for automatically generating a configuration for a network device, comprising: a network interface that is coupled to the data network for receiving one or more packet flows therefrom; a processor; one or more stored sequences of instructions which, when executed by the processor, cause the processor to carry out the steps of: receiving a partial configuration for a network device, wherein the partial configuration comprises a plurality of configuration commands, wherein each of one or more of the configuration commands is associated with one of a plurality of user interface elements;

parsing the partial configuration to identify the user interface elements;

generating a local user interface page based on the user interface elements;

receiving one or more configuration parameter values via the user interface page;

substituting the configuration parameter values into the partial configuration to result in creating a complete configuration for the device;

wherein the partial configuration is at least partially customized with one or more configuration parameter values specific to a network service provider prior to shipment of the network device to a user;

wherein each of the user interface elements comprises a data variable name and a user interface string value;

generating an electronic document that is displayable by an end user computer system that is communicatively coupled to the network device, wherein the electronic document includes the user interface string value;

causing the network device to display the electronic document using the end user computer system;

associating one of the configuration parameter values with the data variable name;

wherein each of the user interface elements further comprises a data type value; and determining whether a data type of the one of the configuration parameter values matches the data type value.

33. An apparatus as recited in claim 23, wherein the partial configuration is stored in non-volatile memory of the network device prior to shipment of the network device to a user.

34. An apparatus as recited in claim 23, wherein the partial configuration comprises an electronic configuration template that is stored in non-volatile memory of the network device prior to shipment of the network device from a service provider or vendor to a user.

35. An apparatus as recited in claim 23, wherein the network device comprises a customer premises equipment (CPE) device.

36. An apparatus as recited in claim 32, wherein the user interface string value comprises a sequence of characters for display in the user interface page as part of a prompt for entering an associated configuration parameter value.

37. An apparatus as recited in claim 32, wherein the data type value specifies a data type associated with the user interface element for use in determining validity of the received configuration parameter values.

38. An apparatus as recited in claim 37, wherein the data type value is selected from among a set consisting of IP address, subnet mask, dial pattern, virtual channel identifier, virtual path identifier, username, password, gateway, hostname, group name, group key, and peer IP address.

39. An apparatus as recited in claim 32, wherein the partial configuration further comprises one or more dynamic tags that are not associated with user interface elements, and wherein the method further comprises the steps of:

parsing the partial configuration to identify the dynamic tags;

substituting a configuration parameter value for each of the dynamic tags as part of the complete configuration.

40. A method of enabling a network service provider to customize a configuration of a network device, the method comprising the computer-implemented steps of:

creating and storing a partial configuration for a network device within the network device, wherein the partial configuration comprises a plurality of configuration commands, wherein each of one or more of the configuration commands is associated with one of a plurality of user interface elements;

providing the network device with the partial configuration to an end user, wherein setup of the network device causes the network device to perform the steps of parsing the partial configuration to identify the user interface elements; generating a local user interface page based on the user interface elements; receiving one or more configuration parameter values via the user interface page; and substituting the configuration parameter values into the partial configuration to result in creating a complete configuration for the device;

wherein the partial configuration is at least partially customized with one or more configuration parameter values specific to the network service provider before providing the device to the end user;

wherein each of the user interface elements comprises a data variable name and a user interface string value;

generating an electronic document that is displayable by an end user computer system that is communicatively coupled to the network device, wherein the electronic document includes the user interface string value;

causing the network device to display the electronic document using the end user computer system;

associating one of the configuration parameter values with the data variable name;

wherein each of the user interface elements further comprises a data type value; and determining whether a data type of the one of the configuration parameter values matches the data type value.

41. A method as recited in claim 40, wherein the partial configuration is stored in non-volatile memory of the network device before providing the device to the user.

42. A method as recited in claim 40, wherein the partial configuration comprises an electronic configuration template that is stored in non-volatile memory of the network device prior to providing the network device from a service provider or vendor to the user.

43. A method as recited in claim 40, wherein the network device comprises a customer premises equipment (CPE) device.

44. A method as recited in claim 40, wherein the user interface string value comprises a sequence of characters for display in the user interface page as part of a prompt for entering an associated configuration parameter value.

45. A method as recited in claim 40, wherein the data type value specifies a data type associated with the user interface element for use in determining validity of the received configuration parameter values.

46. A method as recited in claim 45, wherein the data type value is selected from among a set consisting of IP address, subnet mask, dial pattern, virtual channel identifier, virtual path identifier, username, password, gateway, hostname, group name, group key, and peer IP address.

47. A method as recited in claim 40, wherein the partial configuration further comprises one or more dynamic tags that are not associated with user interface elements, and wherein the method further comprises the steps of:

parsing the partial configuration to identify the dynamic tags;

substituting a configuration parameter value for each of the dynamic tags as part of the complete configuration.

48. A method of enabling a network service provider to customize a configuration of a network device, the method comprising the computer-implemented steps of:

creating a partial configuration for a network device, wherein the partial configuration comprises a plurality of configuration commands, wherein each of one or more of the configuration commands is associated with one of a plurality of user interface elements;

storing the partial configuration in the network device;

providing the network device with the partial configuration to an end user, wherein setup of the network device causes the network device to perform the steps of parsing the partial configuration to identify the user interface elements; generating a local user interface page based on the user interface elements; receiving one or more configuration parameter values via the user interface page; and substituting the configuration parameter values into the partial configuration to result in creating a complete configuration for the device;

receiving a configuration request from the device, based on the device operating according to the complete configuration;

wherein the partial configuration is at least partially customized with one or more configuration parameter values specific to the network service provider before providing the device to the end user;

wherein each of the user interface elements comprises a data variable name and a user interface string value;

generating an electronic document that is displayable by an end user computer system that is communicatively coupled to the network device, wherein the electronic document includes the user interface string value;

causing the network device to display the electronic document using the end user computer system;

associating one of the configuration parameter values with the data variable name;

wherein each of the user interface elements further comprises a data type value; and determining whether a data type of the one of the configuration parameter values matches the data type value.

* * * * *